(12) United States Patent
Margulis et al.

(10) Patent No.: US 6,223,149 B1
(45) Date of Patent: *Apr. 24, 2001

(54) NON-DISTRIBUTED LAN EMULATION SERVER REDUNDANCY METHOD

(75) Inventors: David Margulis, Haifa; Sarit Shani, Tel Aviv; Haim Rochberger, Netanya; Gonen Ziv-Av, Tel Mond, all of (IL)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,918

(22) Filed: May 28, 1998

(51) Int. Cl.$^7$ ................................ H04J 1/16; G06F 9/455

(52) U.S. Cl. ............................ 703/27; 703/28; 370/395; 370/216; 709/238; 714/28

(58) Field of Search ......................... 395/500.44, 500.46, 395/500.48, 200.31, 200.33, 200.68; 370/216, 389, 395; 703/27, 28; 709/238, 224; 714/11, 28

(56) References Cited

U.S. PATENT DOCUMENTS

| | | | |
|---|---|---|---|
| 4,823,338 | 4/1989 | Chan et al. | 370/85 |
| 4,975,906 | 12/1990 | Takiyasu et al. | 370/85.13 |
| 5,214,646 | 5/1993 | Yacoby | 370/85.14 |

(List continued on next page.)

FOREIGN PATENT DOCUMENTS

| | | | |
|---|---|---|---|
| WO97/04386 | 6/1997 | (WO) | G06F/9/455 |
| WO98/02821 | 1/1998 | (WO) | G06F/13/00 |

OTHER PUBLICATIONS

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

(List continued on next page.)

*Primary Examiner*—Kevin J. Teska
*Assistant Examiner*—Thai Phan
(74) *Attorney, Agent, or Firm*—Howard Zaretsky; David J. Weitz; Wilson Sonsini Goodrich & Rosati (57) ABSTRACT

A method of providing redundancy in a LAN Emulation network in the event an LES fails. The method is light in that it does not require complicated database synchronizations between LECSs and their associated complex message protocol exchanges. The method comprises defining a plurality of LESs per ELAN, but permitting only one of the LESs to be active at any one moment in time. All the LECSs are configured with the same Topology Database which include the all the potential LESs for each ELAN. The LECSs try to connect to each LES and the results are logged. The operative LESs having the highest priority is chosen as the active LES whereby all LECs get assigned to the active LES. When the active LES fails the LECs attempt a new connection to LECs. The LECs assigns the LECs to another operative LES in the database list. All the LECs previously connected to the failed LES, are attached to the new LES assigned by the LECs and communications are reestablished with the new LES. Splits are handles by having the LECs choose the LES with the highest priority to be the new active LES and sending a message to all the other LESs instructing them to disconnect their attached LECs. This causes the LECs to re-attach to the active LES.

14 Claims, 5 Drawing Sheets

U.S. PATENT DOCUMENTS

| | | | |
|---|---|---|---|
| 5,280,476 | 1/1994 | Kojima et al. | 370/60.1 |
| 5,280,481 | 1/1994 | Chang et al. | 370/85.13 |
| 5,291,477 | 3/1994 | Liew | 370/54 |
| 5,315,582 | 5/1994 | Morizono et al. | 370/16 |
| 5,321,693 | 6/1994 | Perlman | 370/85.13 |
| 5,321,694 | 6/1994 | Chang et al. | 370/85.13 |
| 5,329,527 | 7/1994 | Ujihashi et al. | 370/85.13 |
| 5,329,619 | 7/1994 | Page et al. | 395/200 |
| 5,345,558 | 9/1994 | Opher et al. | 395/200 |
| 5,361,256 | 11/1994 | Doeringer et al. | 370/60 |
| 5,390,184 | 2/1995 | Morris | 370/94.2 |
| 5,394,402 | 2/1995 | Ross | 370/94.1 |
| 5,408,469 | 4/1995 | Opher et al. | 370/60.1 |
| 5,420,862 | 5/1995 | Perlman | 370/85.13 |
| 5,444,702 | 8/1995 | Burnett et al. | 370/60.1 |
| 5,455,865 | 10/1995 | Perlman | 380/49 |
| 5,483,536 | 1/1996 | Gunji et al. | 370/85.14 |
| 5,491,690 | 2/1996 | Alfonsi et al. | 370/60 |
| 5,495,479 | 2/1996 | Galaand et al. | 370/60 |
| 5,519,704 | 5/1996 | Farinacci et al. | 370/85.13 |
| 5,544,327 | 8/1996 | Dan et al. | 395/250 |
| 5,548,646 | 8/1996 | Aziz et al. | 380/23 |
| 5,548,723 | 8/1996 | Pettus | 395/200.01 |
| 5,550,816 | 8/1996 | Hardwick et al. | 370/60 |
| 5,550,818 | 8/1996 | Brackett et al. | 370/60 |
| 5,566,014 | 10/1996 | Glance | 359/124 |
| 5,583,865 | 12/1996 | Esaki et al. | 370/397 |
| 5,590,118 | 12/1996 | Nederlof | 370/218 |
| 5,600,608 | 2/1997 | Bertin et al. | 370/351 |
| 5,600,644 | 2/1997 | Chang et al. | 370/404 |
| 5,603,029 | 2/1997 | Aman et al. | 395/675 |
| 5,629,930 | 5/1997 | Beshai et al. | 370/396 |
| 5,633,869 | 5/1997 | Burnett et al. | 370/396 |
| 5,649,108 | 7/1997 | Spiegel et al. | 395/200.12 |
| 5,659,542 | 8/1997 | Bell et al. | 370/496 |
| 5,666,487 | 9/1997 | Goodman et al. | 395/200.76 |
| 5,673,263 | 9/1997 | Basso et al. | 370/396 |
| 5,835,481 * | 11/1998 | Akyol et al. | 370/216 |
| 5,870,589 * | 2/1999 | Alexander et al. | 395/500 |
| 5,898,669 * | 4/1999 | Shimony et al. | 370/232 |
| 6,041,063 * | 3/2000 | Povlsen et al. | 370/465 |
| 6,081,836 * | 6/2000 | Karapetkov et al. | 709/218 |

OTHER PUBLICATIONS

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburst.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

NON-DISTRIBUTED LAN EMULATION SERVER REDUNDANCY METHOD

FIELD OF THE INVENTION

The present invention relates generally to data communication networks and more particularly relates to a non distributed method of providing LAN Emulation Server (LES) redundancy in LAN Emulation environment.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

LAN Emulation

Today, most data traffic in existing customer premise networks travels over legacy LANs. It is desirable to permit these legacy LANs and their embedded infrastructure to operate with new ATM networks currently being deployed. To enable an easier migration path to ATM, the ATM Forum has defined LAN Emulation (LANE) specification which allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Figure 1:
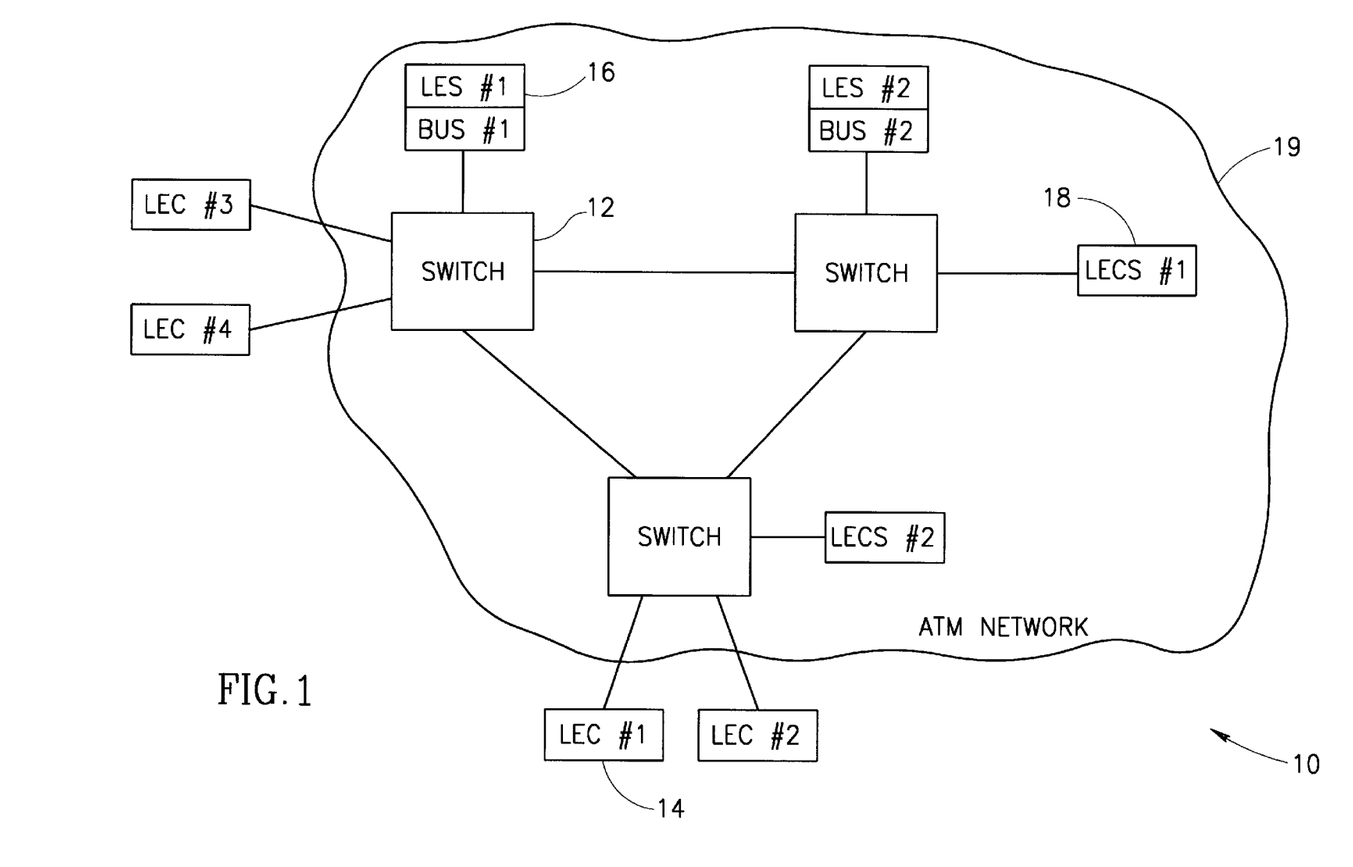
FIG. 1 is a diagram illustrating an example ATM network having a plurality of nodes, LESs, LECSs, and LECs.

Emulation over ATM networks, the LANE Version 1.0 standard drafted by the ATM Forum and incorporated herein by reference, defines the LANE architecture and a set of protocols used by the LANE entities. LANE uses a client/server model to provide its services. A diagram illustrating an example ATM network having a plurality of nodes, LESs, LECSs and LECs, is shown in FIG. 1. The network, generally referenced 10, comprises an ATM network cloud 19 which includes a plurality of nodes 12 connected by one or more links. A plurality of LECs 14 labeled LEC #1 through LEC #4 are connected to the switches. A plurality of LESs 16 labeled LES #1 and LES #2 are also connected to switches. In addition, a plurality of LECS 18 labeled LECS #1 and LECS #2 are connected to switches.

The entities defined by the LANE architecture include LAN Emulation Clients (LECs), a LAN Emulation Server (LES), a Broadcast and Unknown Server (BUS) and LAN Emulation Configuration Server (LECS). The LES, BUS and LECS constitute what is known to as the LANE Service.

The LAN Emulation Clients (LECs) represent a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as is typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LANE Bus is responsible for the distribution of the Broadcast, Multicast and unknown traffic to the LECs which it typically sent by a LEC before the ATM address has been resolved. Note that a given BUS serves only one emulated LAN.

The LECS contain the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

In these types of implementations, what happens is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc.

In connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

In the draft Version 2.0 of the LANE standard, the services include having multiple LES with each LES having multiple ELANs. The LECs (clients) are apportioned across the LESs. Redundancy is handled by defining several LESs for the same ELAN, i.e., LES #1, LES #2, etc. The prior art redundancy method is described in connection with FIG. 2 which illustrates a portion of an example prior art Emulated LAN having a plurality of LECSs, LECs and LESs. The Emulated LAN, generally referenced 30, comprises LECSs 18 labeled LECS #1 and LECS #2, LESs 16 labeled LES #1 and LES #2, BUSs 20 and LECs 14 labeled LEC #1, LEC #2 and LEC#3.

Figure 2:
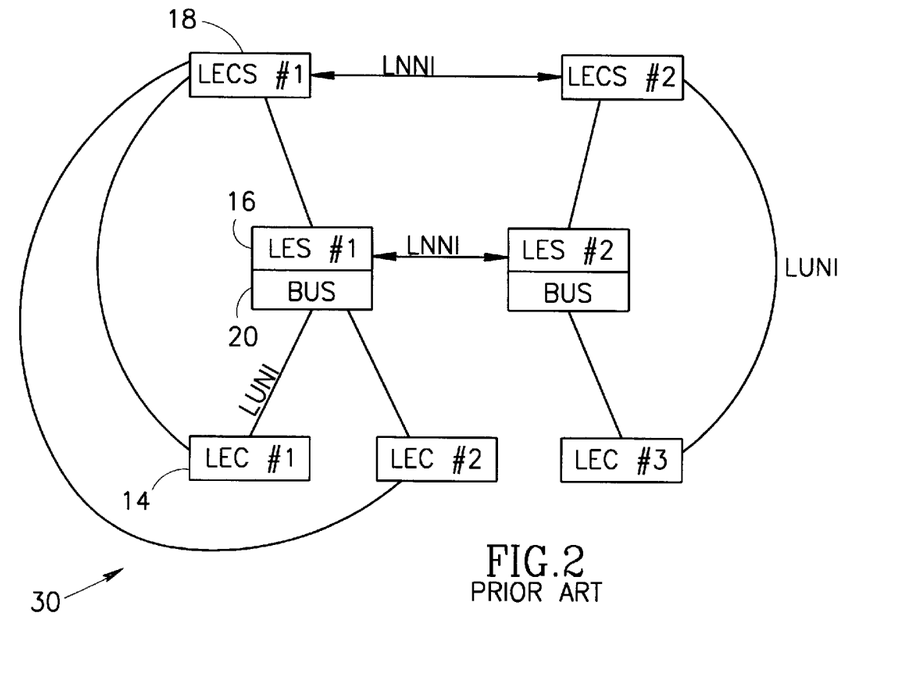
FIG. 2 is a diagram illustrating a portion of an example prior art Emulated LAN having a plurality of LECSs, LECs and LESs.

Via messages communicated among the LECS in the ELAN using the LNNI protocol, the LECSs know at all time the status of the LECSs in the ELAN, i.e., whether the LECS is currently up or down. In addition, each LECS maintains a list of currently active LESs. This provides redundancy for the ELAN in that when a LEC discovers that its LES failed, it goes to the LECS which assigns the LEC to another LES. The LECS can assign the LEC to another LES since it has knowledge of which LESs are up or down.

A disadvantage to this approach is that it requires heavy protocols and supporting mechanisms to implement. The LNNI proposed model includes protocols between LESs, protocols between LECSs and protocols between LECSs and LESs. These protocols are necessary for (1) synchronization purposes, to insure that all the entities of the same type use the same database and for (2) distribution of LAN Emulation control frames between various entities. Note that the LNNI specification is currently scheduled to be standardized by the end of 1998.

In the distributed model of the LES service, there may be several active LESs per ELAN. An active LES is defined as a LES for which there is at least one LEC connected to it. As long as the subnetwork does not physically split into several subnetworks, the existence of more than one active LES is not valid in the non distributed implementation of the LES. The situation wherein more than one active LES is associated with an ELAN in a single subnetwork is called a split.

To provide redundancy, a mechanism is required for synchronize all the LECSs in the network. This requires additional complexity to be added to the network. More specifically, in order for LANE to function properly, each LES must maintain a database of all LECs that have joined the ELAN. In the event one LES fails, another LES can take over the functions of the failed LES. Previously, with a single LES, no protocols or synchronization communications were necessary. With a distributed approach to redundancy, all LESs are required to exchange data and synchronize their databases via the LNNI protocol.

SUMMARY OF THE INVENTION

The present invention solves the problem of redundancy in the event a LES in the network fails. Thus, utilizing the method of the present invention, a LANE on a network will not fail in the event one of the LESs fails. The method is operative to provide redundancy in the event of a LES failure without requiring database synchronizations of the LECSs and their associated complex message protocol exchanges.

Although the method provides for multiple LESs, only one LES is active at any one time. The method includes a mechanism whereby each LECS maintains an active list of LESs and wherein the LECSs implicitly maintain synchronization with each other without protocol message passing. Each LECS maintains a list LESs in a database. The database list of LESs is configured in the LECS as an ordered list of LESs.

The LECS attempts to establish connections via standard signaling to each LES on the list while logging the results. The results include whether or not a connection was successively established to each LES. The operative LES, i.e., one to which the connection was established, having the highest priority is chosen as the active LES. As LECs try to join the ELAN, they get assigned to the active LES. The LECS periodically attempts to reestablish connections to all the non operative LESs. Thus, at any moment in time, each LECS has an updated list of all operative LESs.

When a LECS receives a RELEASE message indicating that a connection to one of the LESs was released, the LECS immediately attempts to reestablish the connection to the particular LES. If the connection cannot be established, due to the fact that the destination was not found, the LES is marked in the database as non operative. When an active LES is marked as non operative, the operative LES next in the ordered list becomes the active LES. Note that this scheme takes advantage of the CRANKBACK feature that is part of the standard signaling protocol. Thus, if a route to the LES exists, the signaling will establish a connection to it.

When the active LES fails, its connections to all the attached LECs are released by the ATM network. All the LECs receive the RELEASE message for this connection and in response, go down and attempt to rejoin the ELAN. Each LEC communicates with the LECS, which assigns them to the new active LES. Thus, eventually, all the LECs that were previously connected to the failed LES, are attached to the new active LES assigned by the LECS.

Note that it is essential that all the LECSs choose the same active LES. Otherwise, there may be several active LESs in the network. The method of the present invention defines a mechanism by which the occurrence of multiple active LESs is discovered and rectified.

There is thus provided in accordance with the present invention, in an Emulated Local Area Network (ELAN) consisting of one or more LAN Emulation Configuration Servers (LECSs), one or more LAN Emulation Servers (LESs) and one or more LAN Emulation Clients (LECs), a method of providing LES redundancy, the method comprising the steps of configuring each LECS with an ordered list LESs potentially available in the ELAN, establishing connections between each LECS and LES in the ELAN, utilizing a standard signaling protocol to determine whether a connection to each LES was successful or not, selecting from among all LESs successfully connected to, a first LES having the highest priority to be a sole active LES and selecting a second LES having the next highest priority from the list of LESs successfully connected to be the active LES in the event the first LES fails or is no longer available.

The method further comprises the step of periodically attempting to establish connections to those LESs that were previously not successfully connected to. The method further comprises the step of attempting to reestablish the connection between the LECSs and the first LES in the event the connection to the first LES fails. The ordered list of LESs is stored in a Topology Database in each LECS.

There is also provided in accordance with the present invention, in an Emulated Local Area Network (ELAN) consisting of one or more LAN Emulation Configuration Servers (LECSs), one or more LAN Emulation Servers (LESs) and one or more LAN Emulation Clients (LECs), a method of restoring synchronization between the LECS in the event synchronization between them is lost, the method comprising the steps of sending a first message on a periodic basis from each LES having at least one LEC associated therewith to each of the LECSs in the ELAN, the first message indicating to each LECS that at least one LECS has designated it an active LES, determining that the LECS are out of synchronization if a LECS receives the first message from more than one LES, selecting an available LES having the highest priority to be the active LES, sending a second message to all non active LESs instructing them to disconnect all LECs connected to them, disconnecting all LECs connected to all non active LESs and forwarding the disconnected LECs to the single active LES.

The method further comprises the step of utilizing a standard signaling protocol to determine whether a connection to each LES was successful or not. The first message comprises an ACTIVE_LEC message and the second message comprises a RELEASE_LEC message. The first message further indicates the number of clients connected to the LES that has at least one LEC associated therewith. Also, the first message is not sent to the LECSs if a LES does not have any LECs associated therewith.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| BUS | Broadcast and Unknown Server |
| CCITT | Comite Consulatif International Telegraphique et Telephonique |
| ELAN | Emulated Local Area Network |
| FDDI | Fiber Distributed Data Interface |
| FSM | Finite State Machine |
| IE | Information Element |
| IISP | Interim Inter-Switch Signaling Protocol |
| IP | Internet Protocol |
| ITU | International Telecommunications Union |
| LAN | Local Area Network |
| LANE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| NMS | Network Management System |
| NNI | Net to Network Interface |
| PNNI | Private Network to Network Interface |
| PTSE | PNNI Topology State Element |
| PTSP | PNNI Topology State Packet |
| PVC | Permanent Virtual Circuit |
| RCC | Routing Control Channel |

-continued

| Term | Definition |
|---|---|
| SVC | Switched Virtual Circuit |
| SVCC | Switched Virtual Channel Connection |
| UNI | User to Network Interface |
| VCC | Virtual Channel Connection |

General Description

The present invention is a method of providing a LES redundancy mechanism in a LAN Emulation network. The method does not require database synchronizations between LECSs and their associated complex message protocol exchanges. The method comprises defining a plurality of LESs per ELAN, but permitting only one of the LESs to be active at any one moment in time. In addition, a plurality of LECSs are defined in the subnetwork. All the LECSs are configured with the same Topology Database which includes all the potentially available LESs for each ELAN. All the LESs in each database are ordered exactly the same in each LECS.

Note that throughout this document, the term operative LES means that a connection can successfully be established to the LES. The term active LES means a single LES chosen from the group of operative LESs that has the highest priority.

Figure 3:
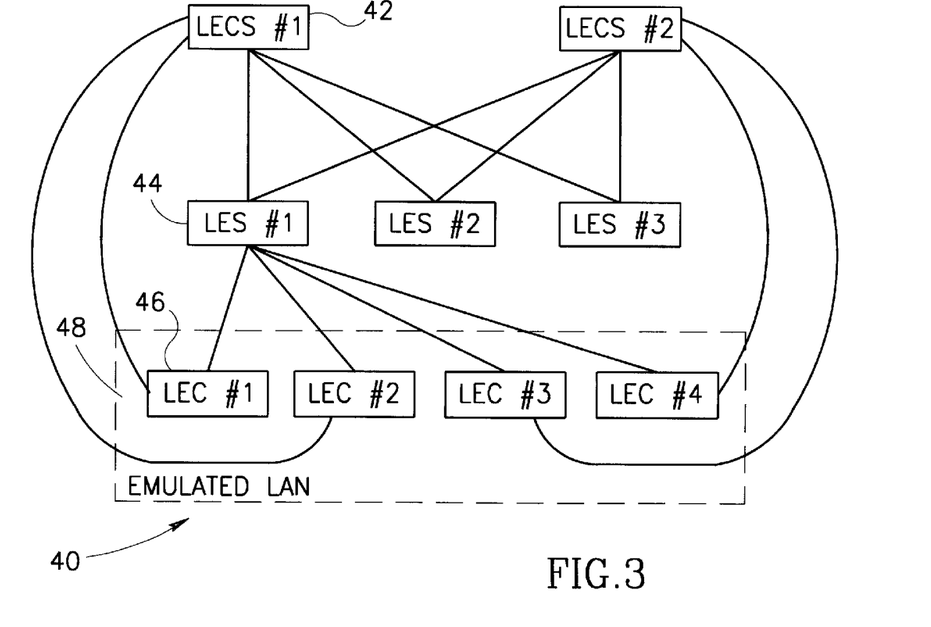
FIG. 3 is a diagram illustrating an example Emulated LAN constructed in accordance with the present invention and having a plurality of LECSs, LECs and LESs.

A diagram illustrating an example Emulated LAN constructed in accordance with the present invention and having a plurality of LECSs, LECs and LESs is shown in FIG. 3. The ELAN portion of the network, generally referenced 40, comprises a plurality of LECSs 42 labels LECS #1 and LECS #2, a plurality of LESs labeled LES #1, LES #2 and LES #3 and a plurality of LECs 46 labeled LEC #1 through LEC #4 which make up Emulated LAN (ELAN) 48.

Each LECS learns about the state of each LES and whether it is up or down by attempting to establish a connection to it. Note that the invention does not provide a keep alive protocol or mechanism between LECSs and the LESs. A keep alive mechanism is, however, provided by the standard signaling protocol. Thus, an LECS learns about the failure of a LES via an indication provided by the standard signaling protocol.

It is important to note that the method functions without employing protocols between LECSs, thus each LECS is not aware of the existence of other LECSs. The operation of each LECS insures that each LECS chooses the same active LES, except during brief transition periods. A relatively simple protocol is used between the LECS and the LES to enable the LECS to synchronize when a split is detected to have occurred. Note that a split problem occurs when several LECSs get out of synchronization and redirect LECs belonging to the same ELAN to different LESs.

The method of the present invention assumes that (1) the network is transitive meaning that if node A can establish a connection via signaling to node B and to node C than node B can establish a connection to node C and (2) that if there exists a physical path between node A and node B, than the signaling process is able to find a path between node A and node B. Note that networks that employ ATM PNNI routing and signaling, which utilize the Crankback mechanism, meet the above two assumptions.

Figure 4:
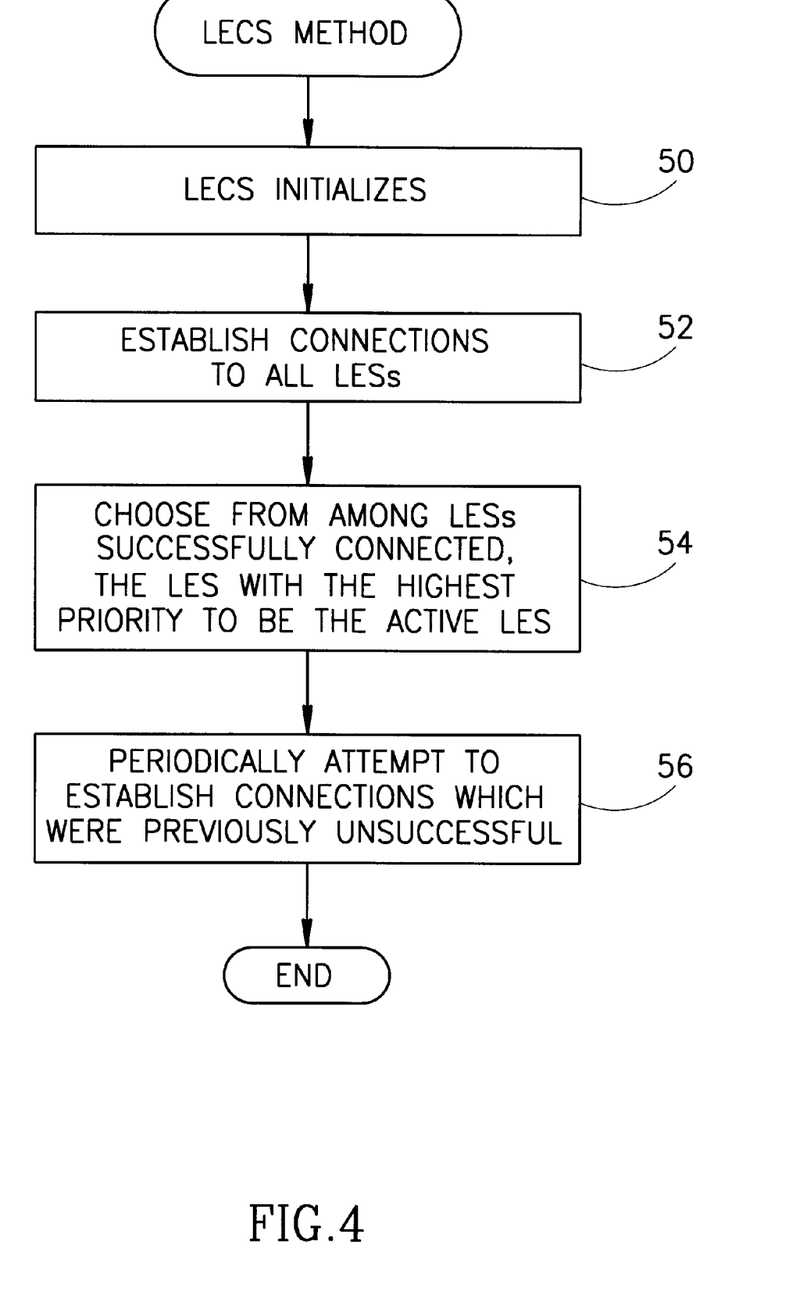
FIG. 4 is a flow diagram illustrating the LECS portion of the method of the present invention.

A flow diagram illustrating the LECS portion of the method of the present invention is shown in FIG. 4. With reference also to FIG. 3, the following description is applicable to each ELAN served by the LECS. When the LECS initializes (step 50) it attempts to establish connections to all the LESs (step 52). The signaling parameters used to establish the connections are chosen such that the connection should not fail due to the lack of network resources, e.g., minimal possible bandwidth, minimal Quality of Service (QoS), etc.

Among the LESs to which the LECS has successfully established a connection, one is chosen having the highest priority and made the active LES (step 54). Note that all the LECSs have the same list of LESs sorted in the same order, thus they will all choose the same LES to be the active LES. Thus, if there is no physical split in the subnetwork, all the LECSs will choose the same LES to be active.

Each LECS then periodically attempts to complete the missing connections to those LESs that it previously failed to connect to (step 56). Thus, each LECS maintains the knowledge of which LESs are currently up and potentially can be used as active LESs. As an example, the database in a LECS may have the following form.

| LES | Up | Active | Number of Clients |
|---|---|---|---|
| LES #1 | Yes | Yes | 20 |
| LES #2 | No | No | |
| LES #3 | Yes | No | |

For each LES listed in the database, a flag is used to indicate whether the LES is up or down. Another flag is used to indicate whether that LES is currently active or inactive. Note that only one LES can be active at any one time and an LES can be up but not active. Further, an entry is made for the number of clients associated with that particular LES. Information on the number of clients can be obtained using messaging as described in more detail hereinbelow. Note that in the steady state only one of the LESs has a Number of Clients entry, the others being blank.

Figure 5:
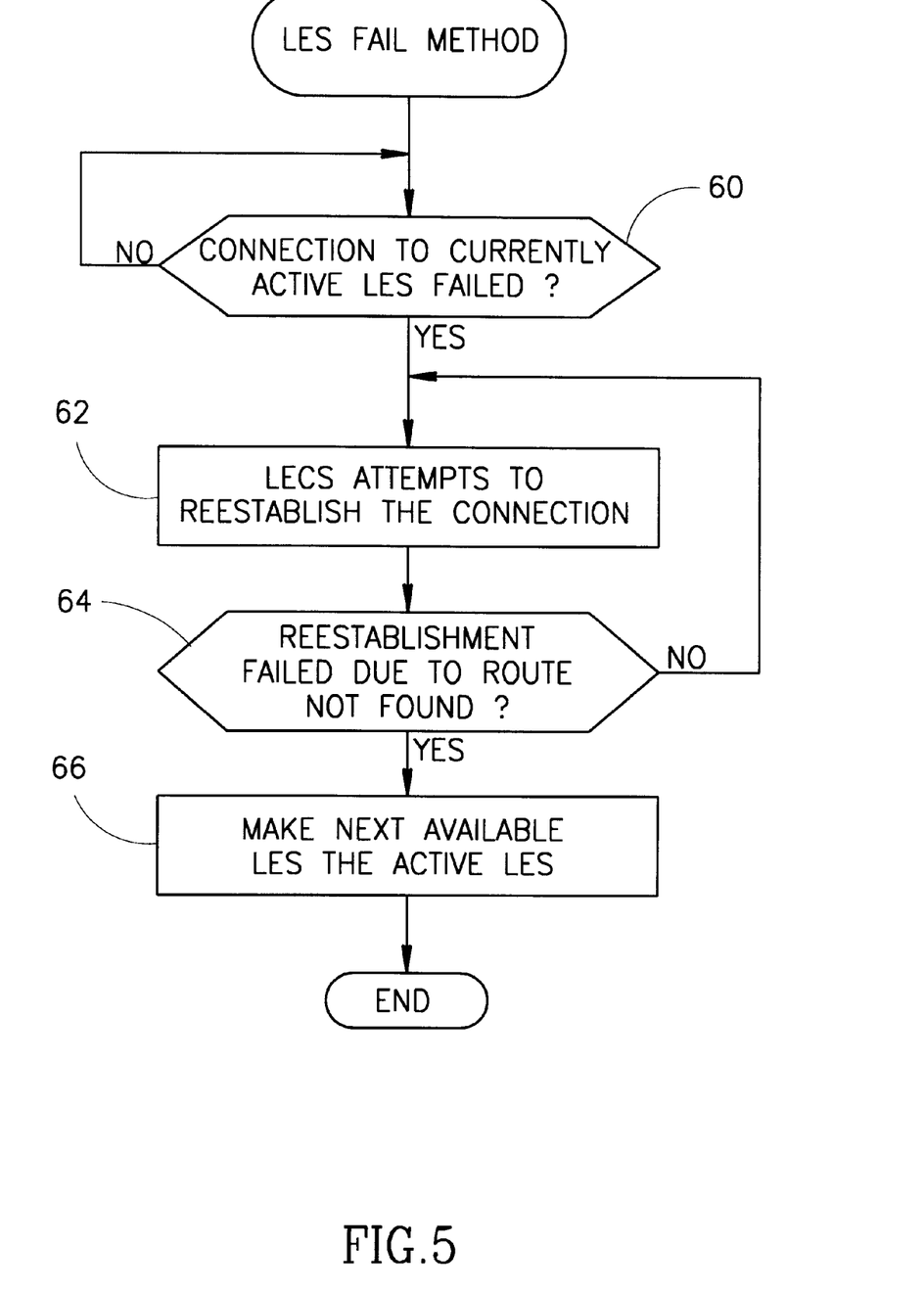
FIG. 5 is a flow diagram illustrating the LES fail portion of the method of the present invention.

A flow diagram illustrating the LES fail portion of the method of the present invention is shown in FIG. 5. In the event the connection to the active LES fails (step 60), the LECS attempts to reestablish the connection (step 62). At this point in the method, the LECS does not declare the failure of the LES since it may be only the link that failed. After repeated attempts by the LECS to reestablish the connection, the LES will be declared failed if either (1) reestablishment of the connection failed due to route not found or (2) a physical split has occurred in the network (step 64).

In either of the above two cases, the LECS chooses the next available LES to be the active LES (step 66). After the new LES is declared the active LES, it remains the active LES even in the event that the connection to the failed LES having a higher priority is reestablished. If a connection to a non active LES fails, then reestablishment of the connection is attempted on a periodic basis.

The method described above performed by the LECS insures that all the LECS will choose the same LES to be the active LES. This is true as long as (1) no physical split occurs in the subnetwork and (2) the LECS themselves to not fail and then recover. The LECSs may get out of synchronization in the event one of the LECSs fails and the recovers or the ELANs recover from a physical split. In the event this occurs, the method of the present invention provides a mechanism for the LECS to resynchronize after the split occurs.

Figure 6:
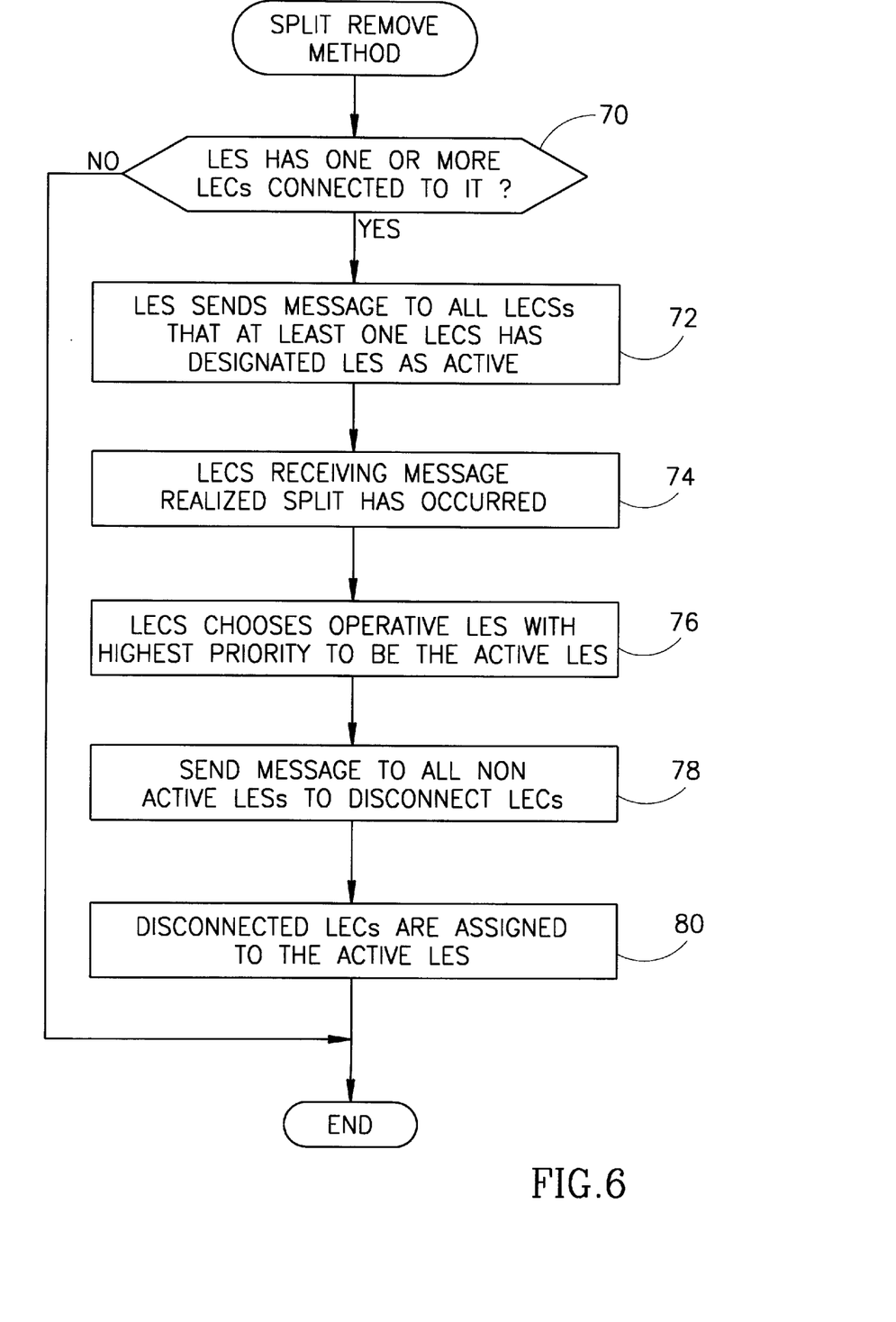
FIG. 6 is a flow diagram illustrating the split/remove portion of the method of the present invention.

A flow diagram illustrating the split/remove portion of the method of the present invention is shown in FIG. 6. As described hereinabove, a split problem occurs when several LECSs get out of synchronization and redirect LECs belonging to the same ELAN to different LESs. In such a situation, however, LECs connected to different active LESs cannot communicate. Note that the LECSs choose a different LES to be the active LES notwithstanding the existence of physical connectivity between the two LECSs. A split problem may arise (1) after a physical split is removed, for example, when the link that caused the physical split is repaired and comes up again or (2) when a LECS recovers from a failure and chooses the LES with the highest priority with which it has connectivity to be the active LES. In either of these situations, the LECSs have gotten out of synchronization.

Each LES having one or more LECs connected to it (step 70) periodically send an ACTIVE_LEC message to all the LECSs informing them that at least one LECS has chosen it to be the active LES (step 72). The ACTIVE_LEC message also contains the number of clients associated with that particular LES. If a LES does not have an LEC associated with it, it does not send an ACTIVE_LEC message. An advantage of this is that it results in relatively low message traffic during steady state conditions, since no messages are sent if a LES does not have associated clients.

When a LECS receives ACTIVE_LEC messages from two different LESs, it concludes that a split has occurred in the network (step 74). At this point, the LECS chooses the operative LES from the available pool of operative LESs that has the highest priority and makes it the new active LES (step 76). Subsequently, the LECS sends a RELEASE_LEC message to the other LESs, i.e., all LESs other than the LES chosen to be the new active LES, instructing them to disconnect all the LECs connected to them (step 78). Once the LECs are disconnected, they are assigned to the new active LES (step 80). At this point, all the LECSs are indirectly synchronized in that they all choose the same LES to be the active LES.

An advantage of the above described split remove method is that the overhead associated with the method is negligible in that a single active LES periodically sends a single short message to the LECS. Another advantage is that the protocol is relatively simple and straightforward. The two messages, i.e., ACTIVE_LEC and RELEASE_LEC, are not protected by a timer since the periodic nature of the mechanism insures retransmitting on an as needed basis.

While the invention has been described with respect to a limited number of embodiments, it will be appreciated that many variations, modifications and other applications of the invention may be made.

What is claimed is:

1. In an Emulated Local Area Network (ELAN) including a plurality of distributed LAN Emulation Configuration Servers (LECSs) and a plurality of LAN Emulation Servers (LESs), a method of providing LES redundancy, said method comprising the steps of:

each said distributed LECS attempting to establish connections with all LESs in said ELAN;

each said distributed LECS generating an ordered list of operative LESs to include those LESs successfully connected to;

each said distributed LECS selecting from among those operational LESs successfully connected to, a first LES having the highest priority associated therewith to be an active LES; and upon failure of the connection between a distributed LECS and the active LES, selecting from among the remaining operational LESs on said distributed LECS' ordered list, a second LES having the second highest priority associated therewith to be the new active LES.

2. The method according to claim 1, further comprising the step of each LECS independently attempting, on a periodic basis, to establish connections to those LESs that were not successfully connected to.

3. The method according to claim 1, further comprising the step of each LECS independently attempting to reestablish its connection to the previously active LES in the event the connection thereto fails.

4. The method according to claim 1, wherein each LECS independently stores its ordered list of LESs in the form of a Topology Database.

5. The method according to claim 1, further comprising the step of each distributed LECS attempting to reestablish its connection to the previously active LES in the event the connection thereto fails, and in the event the connection to the previously active LES is successfully reestablished, the currently active LES remains the active LES.

6. The method according to claim 1, wherein said step of attempting to establish connections utilizes a standard signaling protocol to determine whether the connection was successful or not.

7. In an Emulated Local Area Network (ELAN) including a plurality of distributed LAN Emulation Configuration Servers (LECSs), a plurality of LAN Emulation Servers (LESs), and a plurality of LAN Emulation Clients (LECs), a method of restoring synchronization between said LECSs in the event synchronization between them is lost, said method comprising the steps of:

each said distributed LECS attempting to establish connections with all LESs;

each said distributed LECS generating its own ordered list of operative LESs to include those LESs successfully connected to;

each said distributed LECS selecting from among those operational LESs successfully connected to on said ordered list, a first LES having the highest priority associated therewith to be an active LES;

sending a first message on a periodic basis from each of said LESs having at least one LEC associated therewith to each of said LECSs in said ELAN, said first message indicating to each LECS that at least one LECS has designated it an active LES;

each said distributed LECS determining that it has lost synchronization if it receives said first message from more than one of said LESs;

each said distributed LECS selecting from said LESs in its ordered list, an operational LES having the highest priority to be the new active LES;

each said distributed LECS sending a second message to all LESs in its ordered list other than said active LES instructing them to disconnect all LECs connected to thereto;

each LES, other than the active LES, disconnecting all LECs connected thereto;

each said distributed LECS directing said disconnected LECs to the new active LES; and establishing connections between said distributed LECs and the new active LES.

8. The method according to claim 7, further comprising the step of utilizing a standard signaling protocol to determine whether a connection to each LES was successful or not.

9. The method according to claim 7, wherein said first message comprises an ACTIVE_LEC message.

10. The method according to claim 7, wherein said second message comprises a RELEASE_LEC message.

11. The method according to claim 7, wherein said first message further indicates the number of clients connected to the LES that has at least one LEC associated therewith.

12. The method according to claim 7, wherein said first message is not sent to said LECSs if a LES does not have any LECs associated therewith.

13. The method according to claim 7, wherein each LECS independently stores its ordered list of LESs in the form of a Topology Database.

14. The method according to claim 7, further comprising the step of each LECS independently attempting to reestablish its connection to the previously active LES in the event the connection thereto fails, and in the event the connection to the previously active LES is successfully reestablished, the currently active LES remains the active LES.

* * * * *